(12) United States Patent
Nakajima et al.

(10) Patent No.: US 7,767,018 B2
(45) Date of Patent: Aug. 3, 2010

(54) METAL PIGMENT COMPOSITION

(75) Inventors: Kazuko Nakajima, Tokyo (JP); Shigeki Katsuta, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 0 days.

(21) Appl. No.: 12/312,511

(22) PCT Filed: Nov. 13, 2007

(86) PCT No.: PCT/JP2007/072019

§ 371 (c)(1),
(2), (4) Date: May 14, 2009

(87) PCT Pub. No.: WO2008/059839

PCT Pub. Date: May 22, 2008

(65) Prior Publication Data

US 2010/0058956 A1    Mar. 11, 2010

(30) Foreign Application Priority Data

Nov. 14, 2006  (JP) .............................. 2006-307599

(51) Int. Cl.
C09C 1/62 (2006.01)
C09C 1/64 (2006.01)
C09C 3/06 (2006.01)
C09C 3/08 (2006.01)
C08K 9/00 (2006.01)
C09D 7/12 (2006.01)

(52) U.S. Cl. ................... 106/403; 106/404; 106/479; 106/499

(58) Field of Classification Search ................. 106/403, 106/404, 479, 499
See application file for complete search history.

(56) References Cited

U.S. PATENT DOCUMENTS 4,444,592 A * 4/1984 Ludwig .................. 106/413
5,356,469 A * 10/1994 Jenkins et al. ............. 106/404
5,494,512 A * 2/1996 Yamamoto et al. ......... 106/404
5,637,143 A * 6/1997 Jenkins et al. ............. 106/404
6,602,339 B2 * 8/2003 Hashizume et al. ........ 106/404
2003/0066457 A1 * 4/2003 Hashizume et al. ........ 106/404
2006/0150864 A1 * 7/2006 Hashizume et al. ........ 106/400

FOREIGN PATENT DOCUMENTS

| JP | 4-318181 | 11/1992 |
|---|---|---|
| JP | 7-70468 | 3/1995 |
| JP | 8-502317 | 3/1996 |
| JP | 2759198 | 3/1998 |
| JP | 2000-7939 | 1/2000 |
| JP | 2003-147226 | 5/2003 |
| WO | 95/04783 | 2/1995 |
| WO | 02/31061 A1 | 4/2002 |
| WO | 2004/096921 A1 | 11/2004 |

OTHER PUBLICATIONS

International Search Report for International Application No. PCT/JP2007/072019, mailed Dec. 25, 2007.

* cited by examiner

*Primary Examiner*—Anthony J Green
(74) *Attorney, Agent, or Firm*—Staas & Halsey LLP

(57) ABSTRACT

Disclosed is a metal pigment composition which can be used in an aqueous coating and shows excellent storage stability of a coating agent, and which is reduced in the deterioration of glossiness, hiding power, flip-flop property and the like when formed into a coating film. Specifically disclosed is a metal pigment composition which is treated with at least one amine salt of a heteropoly acid. The heteroatom constituting the heteropoly acid is at least one element selected from the elements belonging to Groups III, IV and V. The polyatom constituting the heteropoly acid is a transition metal. The amount of the amine salt of the heteropoly acid is preferably 0.01 to 10 parts by weight relative to 100 parts by weight of a metal pigment. The metal pigment is preferably an aluminum flake.

18 Claims, No Drawings

METAL PIGMENT COMPOSITION

CROSS REFERENCE TO RELATED APPLICATIONS

This application claims the benefit under 35 U.S.C. Section 371, of PCT International Application No. PCT/JP2007/072019, filed Nov.13, 2007, which claimed priority to Japanese Application No. 2006-307599, filed Nov. 14, 2006 in the Japanese Patent Office, the disclosures of which are hereby incorporated by reference.

TECHNICAL FIELD

The present invention relates to a coating composition, particularly to a metal pigment composition suitable for use in waterborne coatings.

As part of the resource-saving and anti-pollution measure, waterborne coatings that contain only a very small amount of organic solvent or no organic solvent are being used more and more in the field of coatings. The recent remarkable progress in waterborne coating technology has allowed the realization of high-grade appearance of finished coating, which has been accomplished only by solventborne coatings.

In the metallic coatings that contain a metal pigment such as aluminum or zinc, however, there are still only a small number of waterborne coatings which can be considered for practical applications. One reason for this is that metal pigments are easily corroded in waterborne coatings. In a waterborne coating containing a metal pigment, the metal pigment is corroded by water in the acidic, neutral or basic region or in more than one region depending on the character of the metal, which generates hydrogen gas. This raises serious safety problems during the process of coating preparation in coating manufacturers or during the process of coating application to automobiles, consumer electronics or plastics. The corrosion resistance of metal pigments in water or waterborne coatings will be hereinafter referred to as "storage stability".

There is disclosed in PATENT DOCUMENT 1 a metal pigment-containing paste wherein the metal pigment particles have been treated with a heteropolyanion such as phosphomolybdate or phosphotungstate. There is disclosed in PATENT DOCUMENT 2 a metal particle paste which includes metal particles having been treated with a phosphomolybdate pigment. In the processes described in these patent documents, the change in color tone of the metal pigments is unavoidable.

PATENT DOCUMENT 1: JP-A-1996-502317
PATENT DOCUMENT 2: JP-A-2000-7939

DISCLOSURE OF THE INVENTION

Problems to be Solved by the Invention

Accordingly, it is the object of the present invention to provide a metal pigment composition which overcomes the shortcomings of the above prior art. Specifically, it is the object of the present invention to provide a metal pigment composition which can be used in waterborne coatings, making the storage stability of the coatings excellent, and which exhibits a lower loss in brightness, hiding ability and flip-flop effect when the coating films are applied.

Means for Solving the Problems

The present inventors have found that both excellent storage stability and excellent color tone can be accomplished by the use of a metal pigment composition that contains a metal pigment surface-treated with an amine salt of a heteropoly acid which has never been examined, leading to the completion of the present invention.

Specifically, the present invention is as follows.

(1) A metal pigment composition, containing a metal pigment which has undergone surface treatment with at least one amine salt of a heteropoly acid.

(2) The metal pigment composition according to the above (1), wherein the metal pigment is aluminum flakes.

(3) The metal pigment composition according to the above (1) or (2), wherein a heteroatom constituting the heteropoly acid is at least one selected from the group consisting of Group III, IV and V elements.

(4) The metal pigment composition according to the above (3), wherein the Group III, IV and V elements are B, Si and P, respectively.

(5) The metal pigment composition according to any one of the above (1) to (4), wherein polyatom(s) constituting the heteropoly acid is (are) selected from transition metals.

(6) The metal pigment composition according to the above (5), wherein the transition metals are V, Mo and W.

(7) The metal pigment composition according to the above (1) or (2), wherein the heteropoly acid is selected from the group consisting of $H_3PW_xMo_{12-x}O_{40} \cdot nH_2O$ (phospho(tungsto)molybdic acid.n hydrate), $H_{3+x}PV_xMo_{12-x}O_{40} \cdot nH_2O$ (phospho(vanado)molybdic acid.n hydrate), $H_4SiW_xMo_{12-x}O_{40} \cdot nH_2O$ (silico(tungsto)molybdic acid.n hydrate) and $H_{4+x}SiV_xMo_{12-x}O_{40} \cdot nH_2O$ (silico(vanado)molybdic acid.n hydrate), wherein $0 \leq x \leq 12$, $n \geq 0$.

(8) The metal pigment composition according to any one of the above (1) to (7), wherein the amine constituting the amine salt of the heteropoly acid is at least one selected from amine compounds represented by the following general formula (1):

[Formula 1]

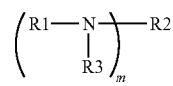

wherein R1, R2 and R3 may be the same or different and each represent a hydrogen atom or a monovalent or divalent hydrocarbon group containing 1 to 30 carbon atoms and optionally containing an ether bond, an ester bond, a hydroxyl group, a carbonyl group and/or a thiol group, provided that R1 and R2 together form a 5- or 6-membered cycloalkyl group, or R1 and R2, together with the nitrogen atom, form a 5- or 6-membered ring that can contain an additional nitrogen or oxygen atom as a bridging member, or R1, R2 and R3 together form a multi-membered multiring composition that may contain one or more additional nitrogen and/or oxygen atoms as bridging members, and that the total number of carbon atoms of R1, R2 and R3 is 2 or more; and m represents the number of 1 to 2.

(9) The metal pigment composition according to any one of the above (1) to (8), wherein the used amount of the amine salt of the heteropoly acid is 0.01 to 10 parts by weight per 100 parts of the metal pigment.

(10) A coating composition, containing the metal pigment composition according to any one of the above (1) to (9).

ADVANTAGES OF THE INVENTION

The application of the metal pigment composition of the present invention to a waterborne coating provides the coating having a good storage stability, and provides the coating film excellent in brightness, hiding ability and flip-flop effect.

BEST MODE FOR CARRYING OUT THE INVENTION

The present invention will be described in detail below, from the point of view of its preferred embodiments.

The metal pigments used in the present invention are preferably flakes of base metals, such as aluminum, zinc, iron, magnesium, copper and nickel, and flakes of the alloys of the base metals. Particularly preferable are aluminum flakes which are often used as a pigment for metallic coatings. Aluminum flakes suitable for use in the present invention are those having surface texture, particle size and shape which are required for pigments for metallic coatings having surface glossiness, whiteness, brightness, and so on.

The shape of the metal pigments is preferably scale-like one. In the case of aluminum flakes, preferable are those having an average thickness in the range of 0.01 to 5 μm and an average length or width in the range of 1 to 60 μm. The average aspect ratio is preferably in the range of 10 to 2000. The aspect ratio as used herein means the value obtained by dividing the average length of scaly aluminum flakes by the average thickness of the same. Aluminum flakes are usually sold on the market in the paste state, and it is preferable to use such aluminum flakes.

The amine salt of the heteropoly acid, which is used in the present invention includes: an element belonging to group III, IV or V; and one or two kinds of transition-metal elements. The heteropoly acid is an oxoacid including 2 or more kinds of central ions, and is distinguished from an isopoly acid including one kind of central ions. The facts that most elements of a periodic table may be used as a hetero atom constituting the heteropoly acid have been confirmed.

The heteropoly acids will be described below, taking the most common structure of heteropoly acids for example. Generally, the heteropoly acids including one kind of transition metal elements are expressed by $H_{(80-a-12b)}[X^{a+}M^{b+}{}_{12}O^{2-}{}_{40}]$, whereas the heteropoly acids including two kinds of transition metal elements are expressed by $H_{\{80-a-12bx-c(12-x)\}}[X^{a+}M^{b+}{}_xN^{c+}{}_{12-x}O^{2-}{}_{40}]$, wherein X represents an element belonging to group III, IV or V, such as B, Si, Ge, P or As; each of M and N represents a transition metal such as V, Nb, Ta, Mo or W; Ti and Zr can be X, M or N.

The heteropoly acids may have a number of structures. The examples of the typical heteropoly acids include: $H_3PW_xMo_{12-x}O_{40}\cdot nH_2O$ (phospho (tungsto)molybdic acid.n hydrate), $H_{3+x}PV_xMo_{12-x}O_{40}\cdot nH_2O$ (phospho(vanado)molybdic acid.n hydrate), $H_4SiW_xMo_{12-x}O_{40}\cdot nH_2O$ (silico (tungsto)molybdic hydrate) and $H_{4+x}SiV_xMo_{12-x}O_{40}\cdot nH_2O$ (silico(vanado)molybdic acid.n hydrate), wherein $0 \leq x \leq 12$, $n \geq 0$.

The examples of the amine constituting the amine salt of the heteropoly acid, which is used in the present invention include: straight-chain primary amines such as ethylamine, propylamine, butylamine, hexylamine, octylamine, laurylamine, tridecylamine and stearylamine; branched primary amines such as isopropylamine, isobutylamine, 2-ethylhexylamine and branched tridecylamine; straight-chain secondary amines such as dimethylamine, diethylamine, dipropylamine, dibutylamine, dihexylamine, dioctylamine, dilaurylamine, di-tridecylamine and distearylamine; branched secondary amines such as diisopropylamine, diisobutylamine, di-2-ethylhexylamine and branched di-tridecylamine; non-symmetrical secondary amines such as methylbutylamine, ethylbutylamine, ethylhexylamine, ethyllaurylamine, ethylstearylamine, isopropyloctylamine and isobutyl-2-ethylhexylamine; straight-chain tertiary amines such as trimethylamine, triethylamine, tripropylamine, tributylamine, trioctylamine, trilaurylamine, tris(tridecyl)amine and tristearylamine; branched tertiary amines such as triisopropylamine, triisobutylamine, tri-2-ethylhexylamine and tris (branched tridecyl)amine; tertiary amines having mixed hydrocarbon groups such as dimethyloctylamine, dimethyllaurylamine, dimethylstearylamine and diethyllaurylamine; and besides, amines having an alkenyl group(s) such as allylamine, diallylamine, triallylamine and N,N-dimethylallylamine; alicyclic primary amines such as cyclohexylamine and 2-methylcyclohexylamine; primary amines having an aromatic ring substituent such as benzylamine and 4-methylbenzylamine; alicyclic secondary amines such as dicyclohexylamine and di-2-methylcyclohexylamine; secondary amines having aromatic ring substituents such as dibenzylamine and di-4-methylbenzylamine; non-symmetrical secondary amines such as cyclohexyl-2-ethylhexylamine, cyclohexylbenzylamine, stearylbenzylamine and 2-ethylhexylbenzylamine; alicyclic tertiary amines such as dimethylbenzylamine, dimethylcyclohexylamine and tricyclohexylamine; tertiary amines having aromatic ring substituents such as tribenzylamine and tri-4-methylbenzylamine; morpholine, 3-methoxypropylamine, 3-ethoxypropylamine, 3-butoxypropylamine, 3-decyloxypropylamine, 3-lauryloxypropylamine, monoethanolamine, diethanolamine, monoisopropanolamine, monopropanolamine, butanolamine, triethanolamine, N,N-dimethylethanolamine, N-methylethanolamine, N-ethylethanolamine, N-propylethanolamine, N-isopropylethanolamine, N-butylethanolamine, N-cyclohexyl-N-methylaminoethanol, N-benzyl-N-propylaminoethanol, N-hydroxyethylpyrrolidine, N-hydroxyethylpiperazine, N-hydroxyethylmorpholine, ethylenediamine, 1,2-propanediamine, 1,3-propanediamine, N,N'-dimethyl-1,3-propanediamine, N-cyclohexyl-1,3-propanediamine, N-decyl-1,3-propanediamine, N-isotridecyl-1, 3-propanediamine, N,N'-dimethylpiperazine, N-methoxyphenylpiperazine, N-methylpiperidine, N-ethylpiperidine, quinuclidine, 1,4-diazabicyclo[2,2,2]octane, or the mixtures thereof.

Of these amines, particularly preferable are stearylamine, di-2-ethylhexylamine, dioctylamine, straight-chain or branched di-tridecylamine, distearylamine, straight-chain or branched tris(tridecyl)amine, tristearylamine, morpholine, N,N-dimethylethanolamine, triethanolamine, and so on.

[Formula 2]

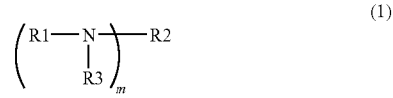

(1)

wherein R1, R2 and R3 may be the same or different and each represent a hydrogen atom or a monovalent or divalent hydrocarbon group containing 1 to 30 carbon atoms and optionally containing an ether bond, an ester bond, a hydroxyl group, a carbonyl group and/or a thiol group, provided that R1 and R2 together form a 5- or 6-membered cycloalkyl group, or R1 and R2, together with the nitrogen atom, form a 5- or 6-membered ring that may contain an additional nitrogen or oxygen atom as a bridging member, or R1, R2 and R3 together form a multi-membered multiring composition that may contain one or more additional nitrogen and/or oxygen atoms as bridging members, and that the total number of carbon atoms of R1, R2 and R3 is 2 or more; and m represents the number of 1 to 2.

These amine salts which are described as the amine salt of the heteropoly acid used in the present invention can be, if necessary, used in combination with at least one amine salt of an isopoly acid selected from various isopoly acids such as molybdic acid and tungstic acid.

The additive amount of the amine salt of the heteropoly acid is in the range of 0.01 to 10 parts by weight and preferably 0.01 to 5 parts by weight per 100 parts of metal pigment.

The metal pigment composition of the present invention can be obtained by mixing treatment of a metal pigment and at least one amine salt of a heteropoly acid.

The amine salt of the heteropoly acid used in the present invention may be added thereto when the raw material metal pigment is ground in a ball mill, or may be mixed with the metal pigment in the state of slurry which has been formed by adding a large amount of solvent, or may be kneaded with the metal pigment in the state of paste which has been formed by adding a small amount of solvent. The amine salt of the heteropoly acid may be added in the as-obtained state or in the state of solution diluted with a solvent. To obtain a uniform mixing, it is preferable to add the amine salt of the heteropoly acid after it is diluted with a solvent or mineral oil. The examples of the solvent or the like used for dilution include: alcohols such as methanol and isopropanol; glycols such as propylene glycol monomethyl ether; hydrocarbon solvents such as hexane, octane, isooctane, benzene, toluene, xylene, tetralin and decalin; industrial gasolines such as mineral spirit and solvent naphtha; and mineral oil.

To the metal pigment composition of the present invention, a surfactant, a silane coupling agent, a titanium coupling agent, a phosphate ester, or an acrylic resin having a phosphate ester group on its side chain may be added, if necessary.

Both hydrophilic and hydrophobic solvents may be used in the treatment of the metal pigment composition of the present invention. Such a solvent can be appropriately selected, depending on its purpose and application, from the group consisting of: alcohols such as methanol, ethanol, propanol, butanol and isopropanol; glycols such as ethylene glycol monoethyl ether, ethylene glycol monobutyl ether, diethylene glycol monoethyl ether, diethylene glycol monobutyl ether, propylene glycol monoethyl ether, propylene glycol monomethyl ether, dipropylene glycol monomethyl ether, propylene glycol, polyoxyethylene glycol, polyoxypropylene glycol and ethylene propylene glycol; hydrocarbons such as benzene, toluene, xylene, cyclohexane, mineral spirit and naphtha; ketones such as acetone, methyl ethyl ketone and methyl isobutyl ketone; and esters such as ethyl acetate, n-butyl acetate, isobutyl acetate, cellosolve acetate and propylene glycol monomethyl ether acetate. Any one of these solvents can be used alone or in combination of two or more.

In the case where the metal pigment composition is kneaded in the slurry state, the concentration of the metal pigment in the slurry is 1 to 50% by weight and preferably 10 to 30% by weight. In the case where the metal pigment composition is kneaded in the paste state, the concentration of the metal pigment in the paste is 50 to 95% by weight and preferably 60 to 85% by weight.

The additive amount of the amine salt of the heteropoly acid is 0.01 to 10 parts by weight and preferably 0.01 to 5 parts by weight per 100 parts of metal pigment. Preferably, this salt is dissolved or dispersed in a solvent or mineral oil before it is added to the metal pigment.

The mixture is stirred and mixed at 10 to 160° C., preferably at 20 to 120° C. for 10 minutes to 72 hours, preferably 20 minutes to 48 hours. The excess solvent is removed so that the final metal pigment content is a desired one, that is, 40 to 90%. The resultant metal pigment composition may be aged at 10 to 120° C., preferably at 30 to 110° C. for 6 hours to 3 months, preferably 1 day to 30 days.

The metal pigment composition obtained according to the present invention can be made into the waterborne metallic coating by adding it to the waterborne coating, wherein the waterborne coating dissolves or disperses resins of a coating film forming component in a medium mainly composed of water, preferably after the amine salt of the heteropoly acid and the metal pigment are mixed and prepared. The metal pigment composition can be directly added to the waterborne coating, but it is preferable to add the metal pigment composition after it is dispersed in a solvent. The examples of the solvent used include: 2-ethyl-1-hexanol, texanol, ethylene glycol monobutyl ether, diethylene glycol monobutyl ether, propylene glycol monomethyl ether, dipropylene glycol monomethyl ether, propylene glycol monomethyl ether acetate, and so on. The above resins include: acrylic resins, polyester resins, polyether resins, epoxy resins, fluorine resins, and so on.

The examples of the acrylic resins include: (meth)acrylate esters such as methyl(meth)acrylate, ethyl (meth)acrylate, isopropyl (meth)acrylate, n-butyl (meth)acrylate, 2-ethylhexyl (meth)acrylate and lauryl (meth)acrylate; (meth)acrylate esters containing active hydrogen such as 2-hydroxyethyl (meth)acrylate, 2-hydroxypropyl (meth)acrylate, 2-hydroxybutyl (meth)acrylate, 3-hydroxypropyl (meth)acrylate and 4-hydroxybutyl (meth)acrylate; unsaturated carboxylic acids such as acrylic acid, methacrylic acid, maleic acid and itaconic acid; unsaturated amides such as acrylamide, N-methylolacrylamide and diacetone acrylamide; and acrylic resins obtained by polymerizing sole monomer selected from the group consisting of other polymerizable monomers, such as glycidyl methacrylate, styrene, vinyltoluene, vinyl acetate, acrylonitrile, dibutyl fumarate, p-styrene sulfonic acid and allyl sulfosuccinic acid, or the mixture thereof.

The above polymerization is generally performed by emulsion polymerization, but such acrylic resins can be also produced by suspension, dispersion or solution polymerization. The polymerization in emulsion polymerization can be performed step by step.

The polyester resins include: those obtained by the condensation reaction of the sole carboxylic acid selected from the group consisting of carboxylic acids such as succinic acid, adipic acid, sebacic acid, dimer acid, maleic anhydride, phthalic anhydride, isophthalic acid, terephthalic acid, trimellitic acid and pyromellitic acid, or the mixture thereof with the sole polyol selected from the group consisting of low-molecular-weight polyols, for example, diols such as ethylene glycol, diethylene glycol, triethylene glycol, propylene glycol, dipropylene glycol, tripropylene glycol, 1,2-propanediol, 1,3-propanediol, 1,2-butanediol, 1,3-butanediol, 1,4-butanediol, 2,3-butanediol, 2-methyl-1,2-propanediol, 1,5-pentadiol, 2-methyl-2,3-butanediol, 1,6-hexanediol, 1,2-hexanediol, 2,5-hexanediol, 2-methyl-2,4-pentanediol, 2,3-dimethyl-2,3-butanediol, 2-ethyl-hexanediol, 1,2-octanediol, 1,2-decanediol, 2,2,4-trimethylpentanediol, 2-butyl-2-ethyl-1,3-propanediol and 2,2-diethyl-1,3-propanediol, triols, such as glycerin and trimethylolpropane, tetraols, such as diglycerin, dimethylolpropane and pentaerythritol, or the mixture thereof; and polycaprolactones as obtained by the ring opening polymerization of ε-caprolactone with hydroxyl groups of a low-molecular-weight polyol.

The polyether polyols include: those obtained by adding alkylene oxide such as ethylene oxide, propylene oxide, butylene oxide, cyclohexene oxide or styrene oxide, alone or in combination to a polyhydroxy compound alone or in combination using a strong-base catalyst such as the hydroxide of lithium, sodium, potassium or the like, alcholate or alkylamine; those obtained by reacting a polyfunctional compound such as ethylenediamine with alkylene oxide; and polymer polyols obtained by polymerizing acrylamide using these polyethers as a medium.

Preferably, these resins are emulsified, dispersed or dissolved in water. To do so, the carboxyl groups or sulfone groups contained in the resins can be neutralized.

To neutralize the carboxyl groups or sulfone groups, one or more neutralizing agents selected from: ammonia; and water-soluble amino compounds such as monoethanolamine, ethylamine, dimethylamine, diethylamine, triethylamine, propylamine, dipropylamine, isopropylamine, diisopropylamine, triethanolamine, butylamine, dibutylamine, 2-ethylhexylamine, ethylenediamine, propylenediamine, methylethanolamine, dimethylethanolamine, diethylethanolamine and morpholine can be used. Preferably, triethylamine or dimethylethanolamine, which is a tertiary amine, is used.

Preferable resins are acrylic resins and polyester resins.

The metal pigment composition according to the present invention can be used in combination with a melamine or isocyanate curing agent or a resin such as urethane dispersion, if necessary. Further, the metal pigment composition according to the present invention can be also used in combination with an inorganic pigment, organic pigment, silane coupling agent, titanium coupling agent, organic phosphate, organic phosphite, ZnDTP (zinc dialkyldithiophosphate), or nitroparaffin, and besides, surfactant, dispersant, anti-settling agent, leveling agent, thickening agent, anti-foaming agent, anti-oxidant, anti-reducing agent, or UV light absorber, which are generally added to coatings.

EXAMPLES

The embodiments of present invention will be illustrated below. The expression "%" as used hereinafter means percent by weight.

Example 1

To 135 g of commercially available aluminum paste (trade name: "GX-3100 (average particle size: 10.5 μm, nonvolatile content: 74%)", Asahi Kasei Chemicals Corporation), dimethylethanolamine salt of phosphotungstomolybdic acid (W=6, Mo=6) was added in an amount of 0.2 parts by weight per 100 parts of aluminum flakes, followed by kneading at 60° C. for 48 hours.

Example 2

To 135 g of commercially available aluminum paste (trade name: "GX-3100 (average particle size: 10.5 μm, nonvolatile content: 74%)", Asahi Kasei Chemicals Corporation), triethanolamine salt of phosphotungstic acid was added in an amount of 0.5 parts by weight per 100 parts of aluminum flakes, followed by kneading at 90° C. for 24 hours.

Example 3

To 68 g of commercially available aluminum paste (trade name: "GX-3100 (average particle size: 10.5 μm, nonvolatile content: 74%)", Asahi Kasei Chemicals Corporation), 232 g of propylene glycol monomethyl ether was added to prepare a slurry with a concentration of 16.7%. To the slurry, dioctylamine salt of phosphomolybdic acid was added in an amount of 1.6 parts by weight per 100 parts of aluminum flakes, followed by stirring at 40° C. for 5 hours. Then, the slurry was filtered to yield an aluminum pigment composition having a nonvolatile content of 78%.

Example 4

To 68 g of commercially available aluminum paste (trade name: "GX-3100 (average particle size: 10.5 μm, nonvolatile content: 74%)", Asahi Kasei Chemicals Corporation), 232 g of mineral spirit was added to prepare a slurry with a concentration of 16.7%. To the slurry, di-tridecylamine salt of phosphovanadomolybdic acid (V=1, Mo=11) was added in an amount of 1.3 parts by weight per 100 parts of aluminum flakes, followed by stirring at 70° C. for 1 hour. Then, the slurry was filtered and aged at 90° C. for 6 hour to yield an aluminum pigment composition having a nonvolatile content of 77%.

Example 5

To 68 g of commercially available aluminum paste (trade name: "GX-3100 (average particle size: 10.5 μm, nonvolatile content: 74%)", Asahi Kasei Chemicals Corporation), 232 g of mineral spirit was added to prepare a slurry with a concentration of 16.7%. To the slurry, tris(branched tridecylamine) salt of phosphomolybdic acid was added in an amount of 2.0 parts by weight per 100 parts of aluminum flakes, followed by stirring at 50° C. for 1 hour. Then, the slurry was filtered and aged at 70° C. for 8 hour to yield an aluminum pigment composition having a nonvolatile content of 79%.

Example 6

To 68 g of commercially available aluminum paste (trade name: "GX-3100 (average particle size: 10.5 μm, nonvolatile content: 74%)", Asahi Kasei Chemicals Corporation), 232 g of mineral spirit was added to prepare a slurry with a concentration of 16.7%. To the slurry, distearylamine salt of phosphomolybdic acid and di-tridecylamine salt of phosphotungstic acid were added in an amount of 1.0 parts by weight per 100 parts of aluminum flakes, respectively, followed by stirring at 50° C. for 5 hours. Then, the slurry was filtered to yield an aluminum pigment composition having a nonvolatile content of 78%.

Example 7

To 68 g of commercially available aluminum paste (trade name: "GX-3100 (average particle size: 10.5 μm, nonvolatile content: 74%)", Asahi Kasei Chemicals Corporation), 232 g of propylene glycol monomethyl ether was added to prepare a slurry with a concentration of 16.7%. To the slurry, dicyclohexylamine salt of phosphovanadomolybdic acid (V=1, Mo=11) was added in an amount of 1.0 parts by weight per 100 parts of aluminum flakes, followed by stirring at 70° C. for 6 hours. Then, the slurry was filtered to yield an aluminum pigment composition having a nonvolatile content of 79%.

Comparative Example 1

As-purchased commercial aluminum paste (trade name: "GX-3100 (average particle size: 10.5 µm, nonvolatile content: 74%)", Asahi Kasei Chemicals Corporation) was used without treating with an amine salt of heteropoly acid.

Comparative Example 2

To 135 g of commercially available aluminum paste (trade name: "GX-3100 (average particle size: 10.5 µm, nonvolatile content: 74%)", Asahi Kasei Chemicals Corporation), ammonium phosphomolybdate was added in an amount of 2.0 parts by weight per 100 parts of aluminum flakes, followed by kneading at 60° C. for 48 hours.

Comparative Example 3

To 68 g of commercially available aluminum paste (trade name: "GX-3100 (average particle size: 10.5 µm, nonvolatile content: 74%)", Asahi Kasei Chemicals Corporation), 232 g of propylene glycol monomethyl ether was added to prepare a slurry with a concentration of 16.7%. To the slurry, phosphomolybdic acid was added in an amount of 2.0 parts by weight per 100 parts of aluminum flakes, followed by stirring at 40° C. for 5 hours. Then, the slurry was filtered to yield an aluminum pigment composition having a nonvolatile content of 76%.

Examples 8-14

Comparative Examples 4-6

Preparation of Metallic Coatings

Waterborne metallic coatings having the following composition were prepared using the aluminum pigment compositions obtained in Examples 1-7 and Comparative Examples 1-3

Aluminum pigment composition: 7.5 g, on the nonvolatile content basis

Mineral spirit: 7.5 g

Propylene glycol monomethyl ether: 10.0 g

Water-soluble acrylic resin: 200 g (trade name "Water-type Plameez #200", manufactured by Origin Electric Co., Ltd.)

Purified water: 50 g

The following evaluations were performed using the prepared waterborne coatings.

[Evaluation 1 (Storage Stability Evaluation)]

200 g of each waterborne metallic coating was taken in a flask, the flask was placed in a constant temperature water bath at 40° C., and the cumulative amount of hydrogen gas generated was observed as long as 120 hours has elapsed. As shown below, three rankings were used according to the amount of hydrogen gas generated to evaluate the storage stability in each coating.

◯: less than 1.0 ml

Δ: 1.0 ml or more and less than 5.0 ml

X: 5.0 ml or more

[Evaluation 2 (Coating-Film Color Tone Evaluation)]

Coating films were formed using the above coatings, and each coating film was evaluated for its brightness, flip-flop effect and hiding ability.

<Brightness>

Brightness was evaluated using laser-type metallic-effect meter, ALCOPE LMR-200, manufactured by Kansai Paint Co., Ltd. The instrument includes: a laser light source from which light enters each sample at an incident angle of 45°; and light receivers which are arranged at acceptance angles of 0° and −35° as optical conditions. IV value was obtained by measuring the light intensity at an acceptance angle of −35°, where the intensity of the light is maximum, in the reflected laser light subtracted by the light reflected in the specular reflection region where laser light is reflected at the coating surface. IV value is a parameter which is proportional to the intensity of regular reflection light from the coating film and indicates the magnitude of the brightness of the film. The criterion was as follows.

◯: difference from Comparative Example 4 being less than 10

X: lower than the brightness of Comparative Example 4 by 10 or more

<Flip-Flop Effect>

Flip-flop effect was evaluated using variable color meter, manufactured by Suga Test Instruments Co., Ltd. F/F value was obtained, using a light source whose angle of incidence was 45 degrees, by plotting graphs of the logarithms of the reflected light intensities (L values) at observation angles (acceptance angles) of 30 degrees and 80 degrees and measuring the slops of the graphs. F/F value is a parameter which is proportional to the orientation degree of a metal pigment and indicates the magnitude of the flip-flop effect. The criterion was as follows.

◯: difference from Comparative Example 4 being less than 0.05

X: lower than the F/F value of Comparative Example 4 by 0.05 or more

<Hiding Ability>

Hiding ability was evaluated by visual observation. The criterion was as follows.

◯: difference from Comparative Example 4 being slight

X: inferior to Comparative Example 4

The results of evaluation 1, 2 are shown in Table 1.

TABLE 1

| | Aluminum pigment composition used | Evaluation 1 Storage stability | Evaluation 2 | | |
|---|---|---|---|---|---|
| | | | Brightness | Flip-flop effect | Hiding ability |
| Example 8 | Example 1 | Δ | ◯ | ◯ | ◯ |
| Example 9 | Example 2 | Δ | ◯ | ◯ | ◯ |
| Example 10 | Example 3 | ◯ | ◯ | ◯ | ◯ |
| Example 11 | Example 4 | ◯ | ◯ | ◯ | ◯ |
| Example 12 | Example 5 | ◯ | ◯ | ◯ | ◯ |
| Example 13 | Example 6 | ◯ | ◯ | ◯ | ◯ |
| Example 14 | Example 7 | ◯ | ◯ | ◯ | ◯ |
| Comparative Example 4 | Comparative Example 1 | X | 240 | 1.90 | Standard |
| Comparative Example 5 | Comparative Example 2 | X | X | X | X |
| Comparative Example 6 | Comparative Example 3 | ◯ | X | X | X |

Example 15

To 78 g of commercially available aluminum paste (trade name: "MH-8801 (average particle size: 16 µm, nonvolatile content: 64%)", Asahi Kasei Chemicals Corporation), 172 g of propylene glycol monomethyl ether was added to prepare a slurry with a concentration of 20%. To the slurry, distearylamine salt of phosphomolybdic acid was added in an amount of 1.0 parts by weight per 100 parts of aluminum flakes, followed by stirring at 50° C. for 3 hours. Then, the slurry was filtered to yield an aluminum pigment composition having a nonvolatile content of 72%.

Example 16

To 78 g of commercially available aluminum paste (trade name: "MH-8801 (average particle size: 16 μm, nonvolatile content: 64%)", Asahi Kasei Chemicals Corporation), 172 g of mineral spirit was added to prepare a slurry with a concentration of 20%. To the slurry, tritridecylamine salt of phosphovanadomolybdic acid (V=1, Mo=11) was added in an amount of 2.0 parts by weight per 100 parts of aluminum flakes, followed by stirring at 70° C. for 30 minutes. Then, the slurry was filtered to yield an aluminum pigment composition having a nonvolatile content of 70%.

Example 17

To 78 g of commercially available aluminum paste (trade name: "MH-8801 (average particle size: 16 μm, nonvolatile content: 64%)", Asahi Kasei Chemicals Corporation), 172 g of mineral spirit was added to prepare a slurry with a concentration of 20%. To the slurry, tris(branched tridecyl)amine salt of phosphotungstomolybdic acid (W=6, Mo=6) was added in an amount of 1.2 parts by weight per 100 parts of aluminum flakes, followed by stirring at 40° C. for 5 hours. Then, the slurry was filtered to yield an aluminum pigment composition having a nonvolatile content of 71%.

Example 18

To 156 g of commercially available aluminum paste (trade name: "MH-8801 (average particle size: 16 μm, nonvolatile content: 64%)", Asahi Kasei Chemicals Corporation), dimethylethanolamine salt of silicotungstic acid was added in an amount of 0.07 parts by weight per 100 parts of aluminum flakes, followed by kneading at 70° C. for 72 hours.

Example 19

To 156 g of commercially available aluminum paste (trade name: "MH-8801 (average particle size: 16 μm, nonvolatile content: 64%)", Asahi Kasei Chemicals Corporation), triethanolamine salt of silicomolybdic acid was added in an amount of 0.05 parts by weight per 100 parts of aluminum flakes, followed by kneading at 90° C. for 24 hours.

Example 20

To 156 g of commercially available aluminum paste (trade name: "MH-8801 (average particle size: 16 μm, nonvolatile content: 64%)", Asahi Kasei Chemicals Corporation), dimethylethanolamine salt of silicovanadomolybdic acid (V=1, Mo=11) was added in an amount of 0.04 parts by weight per 100 parts of aluminum flakes, followed by kneading at 90° C. for 72 hours.

Example 21

To 156 g of commercially available aluminum paste (trade name: "MH-8801 (average particle size: 16 μm, nonvolatile content: 64%)", Asahi Kasei Chemicals Corporation), morpholine salt of phosphovanadomolybdic acid (V=1, Mo=11) was added in an amount of 0.1 parts by weight per 100 parts of aluminum flakes, followed by kneading at 90° C. for 72 hours.

Comparative Example 7

As-purchased commercial aluminum paste (trade name: "MH-8801 (average particle size: 16 μm, nonvolatile content: 64%)", Asahi Kasei Chemicals Corporation) was used without treating with an amine salt of heteropoly acid.

Comparative Example 8

To 156 g of commercially available aluminum paste (trade name: "MH-8801 (average particle size: 16 μm, nonvolatile content: 64%)", Asahi Kasei Chemicals Corporation), ammonium phosphomolybdate was added in an amount of 1.0 part by weight per 100 parts of aluminum flakes, followed by kneading at 70° C. for 72 hours.

Comparative Example 9

To 78 g of commercially available aluminum paste (trade name: "MH-8801 (average particle size: 16 μm, nonvolatile content: 64%)", Asahi Kasei Chemicals Corporation), 172 g of propylene glycol monomethyl ether was added to prepare a slurry with a concentration of 20%. To the slurry, phosphotungstic acid was added in an amount of 2.0 parts by weight per 100 parts of aluminum flakes, followed by stirring at 50° C. for 3 hours. Then, the slurry was filtered to yield an aluminum pigment composition having a nonvolatile content of 78%.

Examples 22-28

Comparative Examples 10-12

Waterborne metallic coatings were prepared in the same manner as above using the aluminum pigment compositions obtained in Examples 15 to 21 and Comparative Examples 7 to 9. And the prepared waterborne metallic coatings were evaluated in the same manner as shown in Table 1 using the coating of Comparative Example 10 as a standard.

The results of evaluation 1, 2 are shown in Table 2.

TABLE 2

| | Aluminum pigment composition used | Evaluation 1 Storage stability | Evaluation 2 | | |
|---|---|---|---|---|---|
| | | | Brightness | Flip-flop effect | Hiding ability |
| Example 22 | Example 15 | ○ | ○ | ○ | ○ |
| Example 23 | Example 16 | ○ | ○ | ○ | ○ |
| Example 24 | Example 17 | ○ | ○ | ○ | ○ |
| Example 25 | Example 18 | Δ | ○ | ○ | ○ |
| Example 26 | Example 19 | Δ | ○ | ○ | ○ |
| Example 27 | Example 20 | Δ | ○ | ○ | ○ |
| Example 28 | Example 21 | ○ | ○ | ○ | ○ |
| Comparative Example 10 | Comparative Example 7 | X | 180 | 1.60 | Standard |
| Comparative Example 11 | Comparative Example 8 | X | X | X | X |
| Comparative Example 12 | Comparative Example 9 | Δ | X | X | X |

INDUSTRIAL APPLICABILITY

The metal pigment composition of the present invention can be used in waterborne coatings or waterborne inks, ensures the good storage stability of the coatings, and keeps the deterioration in brightness, hiding ability and flip-flop effect of the resultant coating films minimum. Thus, its applicability to coatings for automobiles or home electronics is high.

The invention claimed is:

1. A metal pigment composition, comprising a metal pigment which has undergone surface treatment with at least one amine salt of a heteropoly acid.

2. The metal pigment composition according to claim 1, wherein the metal pigment is aluminum flakes.

3. The metal pigment composition according to claim 1, wherein a heteroatom constituting the heteropoly acid is at least one selected from the group consisting of Group III, IV and V elements.

4. The metal pigment composition according to claim 3, wherein the Group III, IV and V elements are B, Si and P, respectively.

5. The metal pigment composition according to claim 1, wherein polyatom(s) constituting the heteropoly acid is (are) selected from transition metals.

6. The metal pigment composition according to claim 5, wherein the transition metals are V, Mo and W.

7. The metal pigment composition according to claim 1, wherein the heteropoly acid is selected from the group consisting of $H_3PW_xMo_{12-x}O_{40} \cdot nH_2O$ (phospho(tungsto)molybdic acid.n hydrate), $H_{3+x}PV_xMo_{12-x}O_{40} \cdot nH_2O$ (phospho(vanado)molybdic acid.n hydrate), $H_4SiW_xMo_{12-x}O_{40} \cdot nH_2O$ silico(tungsto)molybdic acid.n hydrate) and $H_{4+x}SiV_xMo_{12-x}O_{40} \cdot nH_2O$ (silico(vanado)molybdic acid.n hydrate), wherein $0 \leq x \leq 12$, $n \geq 0$.

8. The metal pigment composition according to claim 1, wherein the amine constituting the amine salt of the heteropoly acid is at least one selected from amine compounds represented by the following general formula (1):

[Formula 1]

(1)

wherein R1, R2 and R3 may be the same or different and each represent a hydrogen atom or a monovalent or divalent hydrocarbon group containing 1 to 30 carbon atoms and optionally containing an ether bond, an ester bond, a hydroxyl group, a carbonyl group and/or a thiol group, provided that R1 and R2 together form a 5- or 6-membered cycloalkyl group, or R1 and R2, together with the nitrogen atom, form a 5- or 6-membered ring that may contain an additional nitrogen or oxygen atom as a bridging member, or R1, R2 and R3 together form a multi-membered multiring composition that may contain one or more additional nitrogen and/or oxygen atoms as bridging members, and that the total number of carbon atoms of R1, R2 and R3 is 2 or more; and m represents the number of 1 to 2.

9. The metal pigment composition according to claim 1, wherein the used amount of the amine salt of the heteropoly acid used during surface treatment is 0.01 to 10 parts by weight per 100 parts of the metal pigment.

10. A coating composition, comprising the metal pigment composition according to claim 1.

11. The metal pigment composition according to claim 2, wherein a heteroatom constituting the heteropoly acid is at least one selected from the group consisting of Group III, IV and V elements.

12. The metal pigment composition according to claim 11, wherein the Group III, IV and V elements are B, Si and P, respectively.

13. The metal pigment composition according to claim 12, wherein polyatom(s) constituting the heteropoly acid is (are) selected from transition metals.

14. The metal pigment composition according to claim 13, wherein the transition metals are V, Mo and W.

15. The metal pigment composition according to claim 2, wherein the heteropoly acid is selected from the group consisting of $H_3PW_xMo_{12-x}O_{40} \cdot nH_2O$ (phospho(tungsto)molybdic acid.n hydrate), $H_{3+x}PV_xMo_{12-x}O_{40} \cdot nH_2O$ (phospho(vanado)molybdic acid.n hydrate), $H_4SiW_xMo_{12-x}O_{40} \cdot nH_2O$ silico(tungsto)molybdic acid.n hydrate) and $H_{4+x}SiV_xMo_{12-x}O_{40} \cdot nH_2O$ (silico(vanado)molybdic acid.n hydrate), wherein $0 \leq x \leq 12$, $n \geq 0$.

16. The metal pigment composition according to claim 15, wherein the amine constituting the amine salt of the heteropoly acid is at least one selected from amine compounds represented by the following general formula (1):

[Formula 1]

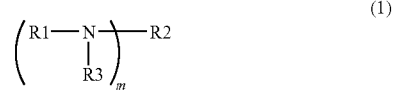

(1)

wherein R1, R2 and R3 may be the same or different and each represent a hydrogen atom or a monovalent or divalent hydrocarbon group containing 1 to 30 carbon atoms and optionally containing an ether bond, an ester bond, a hydroxyl group, a carbonyl group and/or a thiol group, provided that R1 and R2 together form a 5- or 6-membered cycloalkyl group, or R1 and R2, together with the nitrogen atom, form a 5- or 6-membered ring that may contain an additional nitrogen or oxygen atom as a bridging member, or R1, R2 and R3 together form a multi-membered multiring composition that may contain one or more additional nitrogen and/or oxygen atoms as bridging members, and that the total number of carbon atoms of R1, R2 and R3 is 2 or more; and m represents the number of 1 to 2.

17. The metal pigment composition according to claim 16, wherein the used amount of the amine salt of the heteropoly acid is 0.01 to 10 parts by weight per 100 parts of the metal pigment.

18. A coating composition, comprising the metal pigment composition according to claim 17.

* * * * *

UNITED STATES PATENT AND TRADEMARK OFFICE
CERTIFICATE OF CORRECTION

PATENT NO. : 7,767,018 B2
APPLICATION NO. : 12/312511
DATED : August 3, 2010
INVENTOR(S) : Kazuko Nakajima et al.

Page 1 of 1

It is certified that error appears in the above-identified patent and that said Letters Patent is hereby corrected as shown below:

Column 13, Line 61 after "wherein the" delete "used".

Signed and Sealed this

Twenty-first Day of December, 2010

David J. Kappos
*Director of the United States Patent and Trademark Office*